United States Patent [19]

Cole

[11] Patent Number: 4,665,311

[45] Date of Patent: May 12, 1987

[54] SMOKE DETECTING APPARATUS

[76] Inventor: Martin T. Cole, 29 Stafford St., Huntingdale, Victoria, Australia

[21] Appl. No.: 640,344

[22] Filed: Aug. 13, 1984

[30] Foreign Application Priority Data

Aug. 12, 1983 [AU] Australia .............................. PG0820

[51] Int. Cl.⁴ ...................... H01J 40/14; G01N 21/53

[52] U.S. Cl. ........................ 250/214 C; 250/214 AG; 250/574; 307/310; 307/311; 328/2; 328/3

[58] Field of Search ....... 250/214 C, 214 A, 214 AG, 250/238, 206, 214 R, 573–574; 307/310, 311; 328/2, 3; 330/59, 308

[56] References Cited

U.S. PATENT DOCUMENTS

| | | | |
|---|---|---|---|
| 3,480,781 | 11/1969 | Mandalakas | 250/214 C |
| 3,588,535 | 6/1971 | Hellstrom | 307/310 |
| 4,096,382 | 6/1978 | Numata et al. | 250/214 C |
| 4,438,348 | 3/1984 | Casper et al. | 307/311 |

*Primary Examiner*—Edward P. Westin

*Attorney, Agent, or Firm*—Learman & McCulloch

[57] ABSTRACT

A light sensing apparatus comprising a solid-state photocell responsive to low levels of light connected to an impedance matching buffer stage, a gain controlled amplifier stage and an output amplifier stage; a gain control network controlled by a temperature sensor for receiving an amplified signal from said output stage, the gain being adjustable to compensate for temperature dependance of the photocell signal.

9 Claims, 4 Drawing Figures

SMOKE DETECTING APPARATUS

Figure 1:
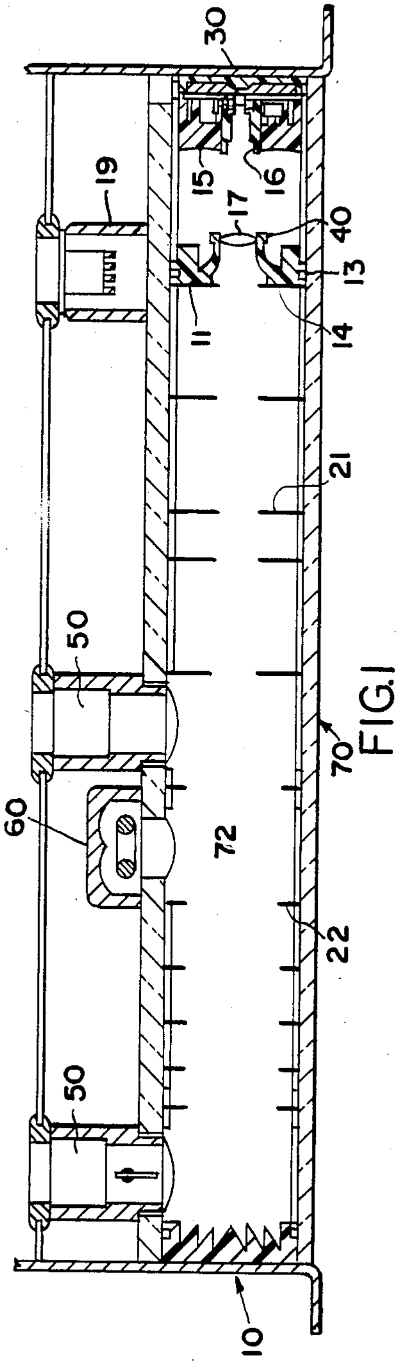

This invention relates to a device for the detection of smoke by light scatter techniques and particularly to a light scatter smoke detection means.

BACKGROUND OF THE INVENTION

Devices are known for the detection of smoke by light scatter techniques. Such devices incorporate a light source configured to irradiate a volume of air provided in a sampling region in which smoke particles may be suspended. Light scattered by said particles is collected on a light detector means. The amplitude of the signal produced from said light detector is an indication of the quantity of smoke suspended in the air.

Particularly sensitive versions of such smoke detectors are also capable of monitoring air pollution. Such high sensitivity enables detection of fires at the earliest possible (incipient) stage, whereby fires may be controlled with portable extinguishers by local personnel before smoke levels become dangerous to life. Such detectors require a sensitivity as high as 20 micrograms per cubic meter for woodsmoke, equivalent to a visual range of 40 km. To achieve such sensitivity, the light source has included a Xenon flashtube and the light detector has been a photomultiplier tube, while both devices are mounted in conjunction with a sampling chamber through which samples of airborne smoke are passed.

A prime objective of the present invention is to provide an improved smoke detector in which the disadvantages inherent with prior art devices are at least substantially overcome.

The disadvantages of the photomultiplier tubes are:

(1) being vacuum-tube devices, they are prone to breakage, damage by vibration, loss of vacuum pressure or gaseous poisoning;

(2) operational life is limited;

(3) care must be taken to avoid exposure to bright light such as sunlight;

(4) sensitivity variation from unit to unit may be a factor of ten or more;

(5) their sensitivity is affected by temperature;

(6) they are of comparitively very high cost.

(7) they require a costly power supply;

(8) they are large and unsuitable for miniaturization.

According to one aspect of the present invention it is proposed that the photomultiplier tube of prior art devices be replaced by an extremely sensitive solid-state light detector.

SUMMARY OF THE INVENTION

The present invention is directed to the use of solid-state detection technology which was hitherto considered impossible at room temperature and at reasonable cost.

Successful solid-state smoke detection results in a more reliable device enabling problems inherent in thermionic valve technology (photomultipliers) such as an extraordinary spread (10 to 1) in sensitivity from device to device, fragility, ageing, degradation when exposed to bright light and the need for a special high voltage power supply of high stability to be overcome.

In a further aspect of the invention the smoke detector according to the present invention comprises a sampling chamber which is internally a round tube, containing a series of devices to absorb light reflected off its internal walls. Air flow through the chamber is achieved by means of two coupling tubes, mounted at right-angles to the chamber. Between the coupling tubes is a sealed reflector and window for a Xenon flash tube as described in my copending U.S. application, Ser. No. 640,345, filed Aug. 13, 1984, to irradiate the particles within the chamber. At one end of the chamber is an extremely sensitive light detector, while at the opposite end is an axial-light absorber as described in my U.S. Pat. No. 4,607,915 issued Aug. 26, 1986. The chamber is airtight except for the coupling tubes. Within one coupling tube is an electronic air flow sensor, air flow being achieved by means of an external fan. Housed beside the chamber is the necessary electronics circuit boards.

The sampling chamber is particularly suited for use with the sampling device or point disclosed in my U.S. Pat. No. 4,608,556, issued Aug. 26, 1986.

Cross-reference is also made to my co-pending U.S. application Ser. No. 663,324, filed Oct. 22, 1984, disclosing optical air pollution monitoring apparatus and U.S. application Ser. No. 731,674, filed May 7, 1985, improved solid state anemometers and temperature, all of which are hereby incorporated herein as part of the disclosure.

With the need for increased ruggedness in case of rough handling, lighter weight to reduce freight costs, enhanced aesthetics, lower cost in high volume and reduced assembly time, a specialized aluminium extrusion is used. While retaining the basic tubular design, the addition of mounting screw-flutes reduces machining requirements, as does the provision of convenient slots to hold one large electronics circuit board. Suitable web design allows for convenient heat-sinking of electronic power devices. Provision of a flat 'table' as a part of the extrusion design, simplifies the mating of coupling tubes and the flash window, obviating saddle-shaped couplings. Opposite this table a parallel flat surface is provided to aid clamping for machining operations.

Jig fabrication of components is thereby dispensed with leading to greater dimensional accuracy and repeatability in production resulting in improved quality control. Furthermore simple assembly provides for simplified servicing. The detector of the present invention is of long life solid-state design with the exception of the Xenon flash-tube. In my co-pending U.S. application Ser. No. 640,345, concurrently filed with this application, a novel focusing reflector designed to accommodate the unusual shape of the Xenon flash tube is disclosed. This improved light source with reduced flash energy wil extend the maintenance period beyond two years under continuous operation.

The provision of an improved light absorber with sampling chamber as disclosed in my abovementioned co-pending application allows significant chamber length reduction to permit rack mounting of the detector in restricted spaces such as telephone exchanges and other equipment rooms. Furthermore the detector of the present invention can be operated from an unregulated 24 volt D.C. supply which could include standby batteries having a supply tolerance in the range of 20–28 volts D.C. in conformity with most conventional fire alarm systems.

Accordingly, the present invention provides in one aspect a PIN photodiode cell responsive to low levels of light connected to an impedance matching buffer stage, a gain controlled amplifier stage and an output amplifier stage; a gain control network controlled by a temperature sensor for receiving an amplified signal from said output stage, the gain being adjustable to compensate for temperature dependence of the photodiode signal.

Conveniently the solid-state photocell is a PIN photodiode cell adapted to be operated in a zero bias photovoltaic mode. Thus extremely high sensitivity is achieved with maximum signal to noise ratio. The detector is coupled with a preamplifier as defined of extremely low noise and high stability over a wide temperature range.

The PIN photodiode cell operating in said zero-bias photovoltaic mode, exhibits variable non-linear sensitivity to low light levels at varying temperature levels. Thus the output of the cell must be accurately calibrated over an operating temperature range of −20° to 50° C.

Conveniently the temperature sensor and photodiode are maintained in an equivalent thermal situation or in thermal contact such that any temperature difference between the two is minimal.

Accordingly the output from the combination of said temperature sensor and gain control network is non-linear in inverse proportion to the non-linearity of the photodiode cell whereby temperature dependence of said cell is substantially eliminated.

There is also provided a power supply filter network to prevent or restrict the injection of noise into any stage of the circuit. Electrical connections for the signal, supply and ground are made using shielded cable.

THE DRAWINGS

Figure 3:
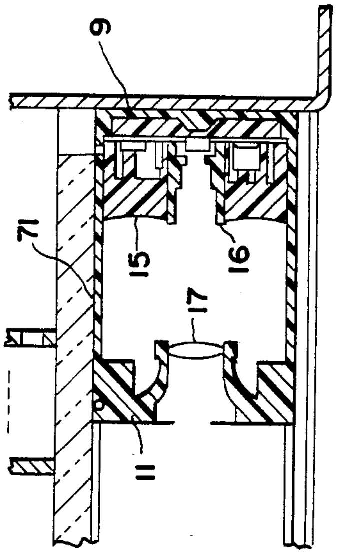
Figure 2:
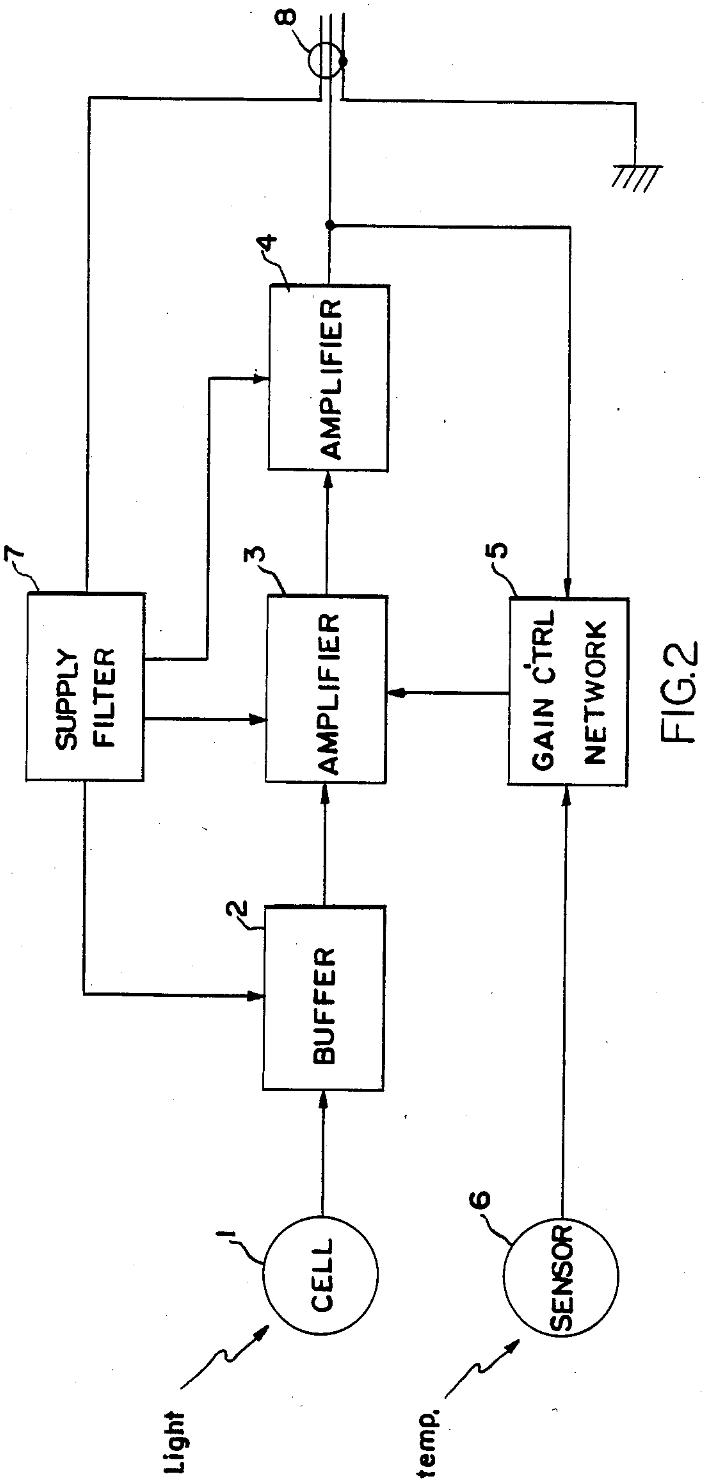
Figure 4:
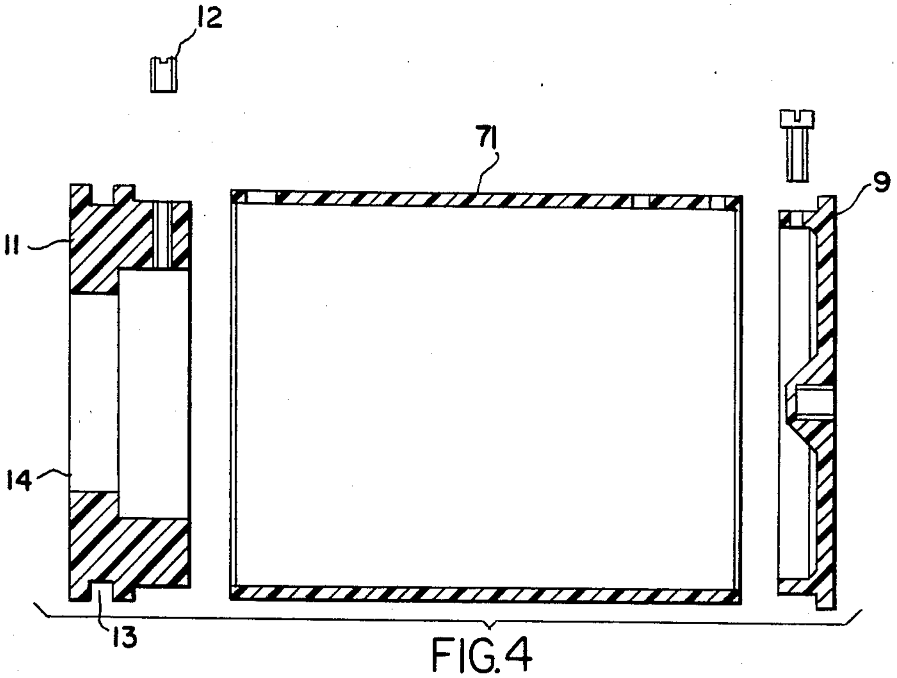

The invention will be described in greater detail having reference to the accompanying drawings in which FIG. 1 is a sectional view of an air sampling chamber, FIG. 2 is a block diagram showing the cell and compensating amplifier circuit, FIG. 3 is a partial view of the sampling chamber showing the lens and detector assembly, FIG. 4 shows an interference shielding container.

THE PREFERRED EMBODIMENT

With reference to FIG. 1 the detector includes a container or housing 71 forming a sampling chamber 70 including a series of irises 21, 22 to absorb and dissipate light reflected off the walls. Coupling tubes 50 are provided to circulate ambient air from an area under fire surveillance into the chamber 70 across region 72 which is subjected to light from an Xenon flash tube in housing 60. Air flow is achieved by a fan (not shown). The length of the air sampling chamber is critical to prevent incidental light being detected and the provision of a novel light absorber 10 enabled a considerable shortening of the tube.

With reference to FIG. 2 the solid-state cell 1 is preferably a PIN photodiode responsive to low light levels and presenting a small signal to an impedance-matching buffer stage 2 connected to a gain-controlled amplifier stage 3 and an output amplifier stage 4. The amplified signal is then fed back to a gain-control network 5 controlled by a temperature sensor 6. The sensor and the PIN photodiode are maintained in close thermal contact such that temperature difference between the two is minimal under variable operating conditions.

The gain of the gain controlled amplifier stage 3 is adjusted to compensate for the temperature dependence of the small signal from PIN photodiode 1.

The output of the temperature sensor and the gain control network is non-linear in inverse proportion with the non-linearity of the PIN photodiode cell such that temperature dependence of the cell signal is substantially eliminated.

The solid-state detector cell 1 must be small to minimize the capacitance which could otherwise result in reduced sensitivity to the flash rise time of about 1 microsecond from the flash tube. As a result the photon or light beam capture area is small compared with a conventional photomultiplier tube. Therefore a focusing lens 17 is provided with associated mounting hardware as shown in FIG. 3.

Referring to FIGS. 3 and 4 the preamplifier circuit is encapsulated in epoxy 15, the circuit being constructed on a printed circuit board mounted against the base 9. To overcome internal reflections, to protect the cell, and to prevent the ingress of epoxy during manufacture a detector attachment 16 is provided. The attachment 16 is positioned within a housing 71 which also houses the lens assembly 17. The preamplifier, detector cell optics and housing become a self contained and separately tested plug-in module connected by means of shielded cable 8. The housing 71 includes a base 9 tightly fitted to the cylinder section. The flange 11 supporting the lens is a sliding fit in the cylinder section at the other end and retained by a grub screw 12. The lens flange includes a mounting 14 for a lens assembly 17 and a sealing O-ring mounted in groove 13. The use of the sealing ring allows the chamber to be sealed so that it can operate at other than atmospheric pressure.

The lens mounting arrangement facilitates removal of the lens or detector assembly to allow easy access to the sampling chamber for servicing purposes.

The PIN photodiode cell is operated in a zero-bias photovoltaic mode which suffers several disadvantages such as lower speed, lower stability, smaller dynamic range, higher temperature coefficient and reduced optical bandwidth when compared with normal photocurrent mode. However a major advantage of zero flicker noise is achievable which allows for maximum possible signal to noise ratio to be obtained. Furthermore the mentioned disadvantages can be compensated for as described herein.

I claim:

1. Smoke detecting apparatus comprising:

light sensing, solid state photocell means for producing signals in response to light;

impedance matching buffer stage amplifier means responsive to said signals for producing an amplified signal at an impedance level adapted for further processing;

gain controlled amplifier stage means responsive to said amplified signal and to a gain controlling signal for producing a gain controlled signal;

output amplifier stage means responsive to said gain controlled signal for producing an output signal;

temperature sensor means for producing a temperature signal indicative of ambient temperature;

gain control network means responsive to said temperature signal and to said output signal for producing said gain controlling signal;

said gain control network means being adjustable to compensate for temperature dependence of the said signals produced by said light sensing solid state photocell means; and means to deliver said gain controlling signal to said gain controlled amplifier stage means.

2. Apparatus according to claim 1 wherein the solid-state photocell means comprises a PIN photodiode cell adapted for operation at a zero bias photovoltaic mode to achieve extremely high sensitivity at maximum signal to noise ratio.

3. Apparatus according to claim 1 wherein the temperature sensor means and the solid state photocell means are maintained in an equivalent thermal environment.

4. Apparatus according to claim 3 wherein said temperature sensor means and said solid state, photocell means are in thermal contract with one another.

5. Apparatus according to claim 2, 3, or 4 wherein said temperature sensor means and said gain control network means produce a first non-linear output and said solid state photocell means produces a second non-linear output, the non-linearity of said first output being in inverse proportion to the non-linearity of said second output, whereby temperature dependence of said solid state photocell means is substantially eliminated.

6. Apparatus according to claim 1 including power supply filter means for supplying biasing power to said impedance matching buffer stage means, said gain controlled amplifier stage means, and said output amplifier stage means, while at the same time at least restricting the injection of noise thereinto.

7. Apparatus according to claim 1, 2, 3, or 4 including means forming a chamber having means for admitting sample air from a remote location, said photocell being positioned in said chamber, light absorbent means accommodated in said chamber and spaced from said photocell, and a light source for emitting light into said chamber between said photocell and said light absorbent means.

8. Apparatus according to claim 7 including means for exhausting air from said chamber, said light source being positioned to emit light into said chamber between said air admitting means and said air exhausting means.

9. Apparatus according to claim 8 wherein said chamber is airtight except for said air admitting means and said air exhausting means.

* * * * *